July 31, 1956     E. S. TUPPER     2,756,793
STORAGE CONTAINER LOCK COVER
Filed March 17, 1955     2 Sheets—Sheet 1
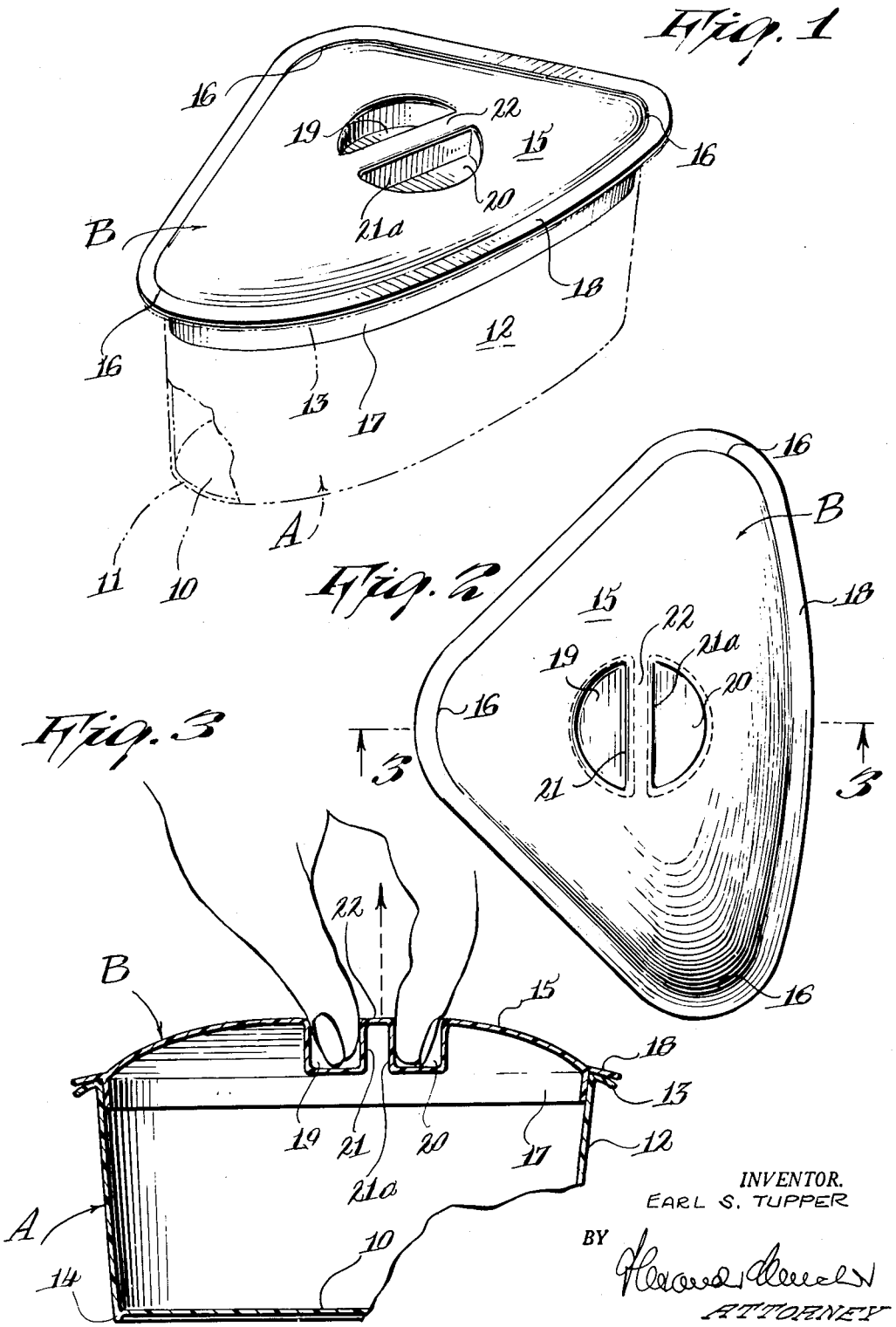
INVENTOR.
EARL S. TUPPER
BY
ATTORNEY July 31, 1956 — E. S. TUPPER — 2,756,793
STORAGE CONTAINER LOCK COVER
Filed March 17, 1955 — 2 Sheets-Sheet 2
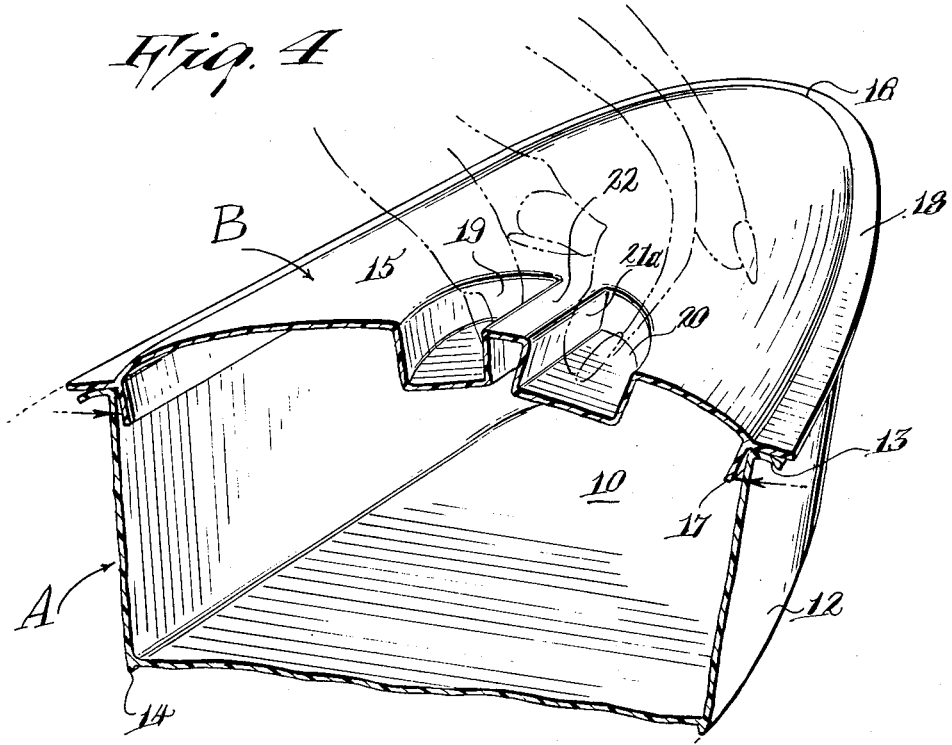
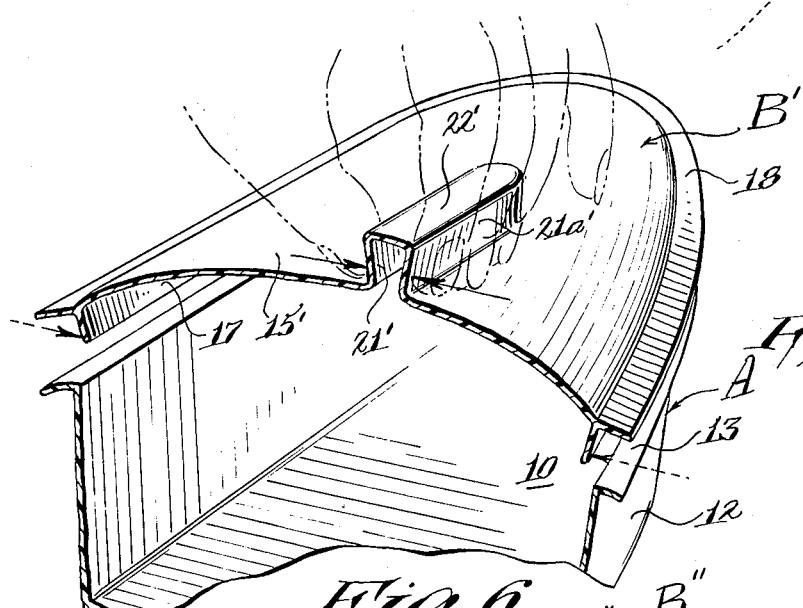
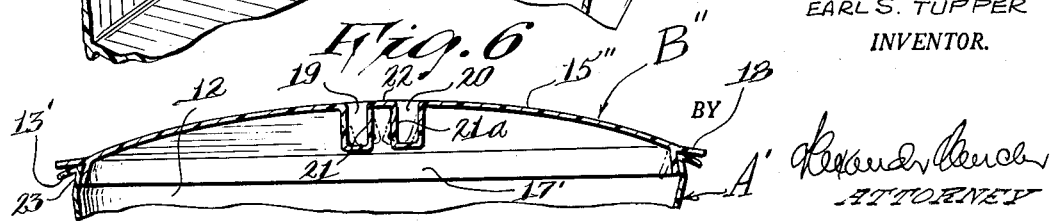
EARL S. TUPPER
INVENTOR.

---

United States Patent Office 2,756,793
Patented July 31, 1956

---

2,756,793

STORAGE CONTAINER LOCK COVER

Earl S. Tupper, Smithfield, R. I.

Application March 17, 1955, Serial No. 494,879

2 Claims. (Cl. 150—.5)

This invention relates generally to a storage container and cover for storing varieties of household food items, but more specifically to a storage container, at least the cover of which is of thin-gauge thermoplastic material normally self shape-retaining but subject to local deformation for application and removal from the container member, the closure being capable of hermetically sealing the container by reason of live and pressurized contact at cooperating portions of the cover and container.

The primary object of the invention herein resides in the provision of an automatic locking type of removable cover for a storage container whereby the contents may be hermetically sealed therewithin, said cover being provided with functional elements which also serve to reinforce the body thereof.

It is a further object of the invention to provide a normally rigid cover member of locally deformable, thermoplastic material having peripheral flanges cooperating with the container member, certain of the flange areas being capable of restriction in lateral dimensions for pressurized sealing and locking with cooperating walls of the container.

A further feature of the invention resides in the provision of a container and cover, wherein the combination serves as a thermal insulator for the contents when the container is made of non-conducting or the same material as the cover.

A further feature of the invention resides in the provision of a storage container at least the cover of which is preferably formed of polyethylene or other thermoplastic substance having similar physical characteristics, including treated styrene, the vinyls and derivatives thereof, all being locally deformable and capable of withstanding and yielding to shock without breakage and fracture. In addition, the material used is non-absorptive to and not readily wetted by water, is odorless, resistant to acids, alkalis, organic solvents and other materials at ordinary temperatures. Moreover, the material does not soften far below the boiling point of water, is resistant to mildews, micro-organisms and insects.

Another object of the invention resides in the provision of the storage container having a removable and lock-type of cover for household items, and which is strong, durable, resistant to wear, tear, shocks of handling, impact, and is further heat and electrically non-conductive.

A further feature of the invention resides in the provision of a cover member which is provided with reinforcing elements such as a curved top wall, peripheral flange elements and a handle conformation for maintaining said cover member in normally rigid condition despite the fact that the cover is relatively thin-gauge.

These objects and other incidental ends and advantages of the invention will hereinafter appear in the progress of the disclosure and as pointed out in the appended claims.

Accompanying the specification are drawings showing a preferred form of the invention wherein:

Figure 1 is a view in perspective of a preferred embodiment of the invention showing the container member in phantom.

Figure 2 is a top plan view of the embodiment of the invention with cover in engaging position with the container.

Figure 3 is a vertical and sectional view partly cut-a-way of the container and cover taken along the plane 3—3 of Figure 2, and shows the insertion of the fingers in the sunken handle for grasping thereof and preliminary to restriction for cover removal.

Figure 4 is a fragmentary and sectional view partly in perspective indicating the restriction or squeezing of the sides of the handle portion to disengage certain of the forced engaging portions of the cover and container.

Figure 5 is a fragmentary and sectional view partly in perspective showing a modified type of cover having constricted elements and in position to be applied to the container member for automatic locking.

Figure 6 is a fragmentary, vertical, and sectional view of a still further modified form of the invention.

In accordance with the invention and the forms shown, Figures 1–4 show a type of storage container and cover suitable for hermetically sealing and storing household food items therewithin. Thus, A represents the container member and B the cover therefor. Container A includes a substantially triangular bottom wall 10 having a curved base and rounded corners 11 integrally formed around its periphery with a continuous side wall 12, substantially as illustrated.

The open upper edge of continuous side wall 12 of container A is integrally formed with an outwardly extending peripheral flange 13 for a purpose which will hereinafter become clear, said flange as shown being downwardly directed.

The undersurface of bottom wall 10 may be integrally formed with a continuous peripheral bead 14 to serve as a spacer between the bottom wall 10 and the supporting surface. As mentioned, side wall 12 is rounded at the corners to maintain normal rigidity of the rim areas especially if the container is formed of locally deformable thermoplastic material. Side wall 12 furthermore is slightly outwardly tapered from bottom wall 10, but it is understood that the taper and size of wall 12 is selective only. Furthermore, peripheral flange 13 also may be of any predetermined size and angular inclination for purposes hereinafter described.

Cover B is formed of locally deformable thermoplastic material such as polyethylene, vinyl, treated styrene or derivatives and cooperates with the side wall 12 and peripheral flange 13 of the container to aid in the shape retaining characteristics thereof when the container is formed of locally deformable plastic. Thus, peripheral flange 13 serves as a reinforcing element for the container rim arresting the tendency of easy distortion thereat. Moreover, flange 13 and the inner side of the container wall 12 adjacent the rim serve as cooperating sealing elements with the cover member as will appear, while flange 13 alone serves as a lifting element when container A is used per se as a canister or open container.

Cover B is provided with a central wall 15 curvilinear or concavo-convex in section and in perimetric shape is geometrically similar to the peripheral shape of container A at least along the open rim portion. Thus, wall 15 is triangular and has a curved base and rounded and tangentially connected corners 16 terminating edgewise in a depending peripheral flange 17 adapted at specific areas for both frictional and compressive or locking engagement with the inner face of side wall 12 adjacent the rim (Figure 3). Cover B around its periphery is also integrally formed with a continuous and outwardly extending flange 18, downwardly inclined if desired and as shown, and is adapted to overlie flange 13 of the container thereby serving as a limit for downward movement of the cover. Flanges 17 and 18 further contribute to rigidity of wall 15 of cover B.

Central wall 15 and centrally thereof is formed with complementary, arcuate and similar and opposite depressed portions 19 and 20, each having laterally spaced straight side walls 21 and 21a defining a central handle portion 22. As shown in Figure 3, handle 22 is capable of being grasped by inserting the thumb and the fingers of one hand downwardly into the depressed portions 19 and 20 with the thumb and fingers engaging the opposite sides 21 and 21a. For removal of the cover, inward pressure is borne between the thumb and the fingers, the curved central wall 15 thereby permitting the lateral dimension of flange 17 at side portions opposite to handle 22 to be decreased as shown in Figure 4 where the cover member B is shown in displaced engagement with container A by reason of compression of handle 22, it being noted that cover flange 17 is spaced from the inner side of rim portions of container wall 12 at opposite sides of handle 22. This contraction of flange portions of 17 permits introduction and removal of cover B on container A. The subsequent engagement of said contracted flange portions of 17 by the elastic return thereof with the inner face of container rim portions of wall 17 is responsible for a tight and locking type of engagement based on the slightly larger normal outer lateral dimension of cover peripheral flange 17 relative to the normal inner lateral dimension of the container wall 12 at the reinforced rim area.

It is to be noted that the areas of peripheral and continuous sealing contact as shown in Figure 3 are between the cover flanges 17, 18 and the container wall 12 at the inner rim area and the container flange 13 respectively.

Figure 5 shows a modified form of cover B' having a top central wall 15' provided with a central and projecting handle member 22' having finger grasping walls 21' and 21a' for contracting opposite portions of flange 17 for removal and application of the cover to the container. Figure 5 shows the cover B' in raised position above container A and in compressed condition preliminary to application to the container.

Figure 6 shows another modified form of the invention wherein cover B" has the same type of handle 22 as shown in Figures 1–4 but wherein central wall 15" has a modified curvilinearity and the flange 17' is outwardly inclined. Furthermore, container A' is provided with an inwardly directed rim portion 23 carrying at the top thereof a peripheral and outwardly directed flange 13'.

Where container A is formed of locally deformable plastic material, the sealing areas between the cover and container are additionally enlivened, but it is understood that container A may be made of more rigid plastic material, or of glass, vitreous or other desired material.

The cover described and the container if formed of plastic may be formed by any of the known methods of molding including injection, compression, blowmolding and vacuum forming means.

I wish it understood that minor changes and variations in the material, gauge thereof, shape, size, method of forming and combination of parts of the invention all may be resorted to without departing from the spirit of the invention and the scope of the appended claims.

I claim:

1. A locking cover for a storage container, the latter having an outwardly disposed peripheral rim edge flange, said locking cover being formed of a flexible thermoplastic material, said cover comprising a concavo-convex top wall and a peripheral and straight side wall extending downwardly therefrom, said side wall being adapted to telescopically and resiliently engage within said container, a peripheral, outwardly disposed flange projecting from the upper end of said side wall adapted to overlie said first mentioned rim edge flange and serve as a stop for penetration of the cover into the container, said top wall having a hollow and hand squeezable conformation centrally thereof for resiliently reducing the distance between opposite portions of said straight side wall in the direction of squeezing pressure for resiliently engaging and disengaging the cover on and from the container.

2. A locking cover for a substantially triangularly shaped storage container, the latter having an outwardly disposed peripheral rim edge flange, said locking cover being formed of a flexible, deformable thermoplastic material, said cover comprising a concavo-convex top wall and a peripheral and straight side wall extending downwardly therefrom and having a triangular shape conforming with said container, said side wall being adapted to telescopically and resiliently engage within said container, a peripheral, outwardly disposed flange projecting from the upper end of said side wall adapted to overlie said first mentioned rim edge flange and serve as a stop for penetration of the cover into the container, said top wall having a hollow and hand squeezable conformation centrally thereof for resiliently reducing the distance between the apex and base of the said peripheral and straight side wall for resiliently engaging and disengaging the cover on and from the container.

References Cited in the file of this patent

UNITED STATES PATENTS

| | | |
|---|---|---|
| 1,776,813 | Lucks | Sept. 30, 1930 |
| 1,948,820 | Lasker | Feb. 27, 1934 |
| 1,969,486 | Kurz | Aug. 7, 1934 |
| 2,479,131 | Pari | Aug. 16, 1949 |
| 2,685,316 | Krasno | Aug. 3, 1954 |
| 2,695,645 | Tupper | Nov. 30, 1954 |